(12) United States Patent
Aguirre et al.

(10) Patent No.: US 8,588,128 B2
(45) Date of Patent: Nov. 19, 2013

(54) MECHANICAL MOUNTING FOR FIXED WIRELESS CUSTOMER PREMISES EQUIPMENT

(75) Inventors: Sergio Aguirre, Southlake, TX (US); Raafat Edward Kamel, Little Falls, NJ (US); Kamlesh S. Kamdar, Dublin, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 13/071,564

(22) Filed: Mar. 25, 2011

(65) Prior Publication Data
US 2012/0243464 A1 Sep. 27, 2012

(51) Int. Cl.
*H04B 7/185* (2006.01)
*H04W 24/00* (2009.01)

(52) U.S. Cl.
USPC ............................................. 370/315

(58) Field of Classification Search
None
See application file for complete search history.

(56) References Cited

U.S. PATENT DOCUMENTS

| | | | | |
|---|---|---|---|---|
| 4,739,337 A | * | 4/1988 | Anderson | 343/882 |
| 6,731,946 B1 | * | 5/2004 | Stanwood et al. | 455/517 |
| 7,102,513 B1 | * | 9/2006 | Taskin et al. | 340/540 |
| 2005/0179607 A1 | | 8/2005 | Gorsuch et al. | |
| 2007/0173303 A1 | | 7/2007 | Viorel et al. | |
| 2010/0171677 A1 | * | 7/2010 | Rakotoarisoa | 343/837 |
| 2010/0311321 A1 | | 12/2010 | Norin | |
| 2010/0313232 A1 | | 12/2010 | Norin | |
| 2012/0042345 A1 | * | 2/2012 | Tjio et al. | 725/63 |

* cited by examiner

*Primary Examiner* — Chirag Shah
*Assistant Examiner* — Srinivasa Reddivalam

(57) ABSTRACT

A combined gateway, for a fixed wireless network, includes a structure mounted to a customer premises, and a satellite antenna mechanically coupled to the structure. The combined gateway also includes an outdoor broadband unit mechanically coupled to the structure via an adjustable extension arm. The outdoor broadband unit connects to the satellite antenna via a first communication link, and connects to customer premises equipment via a second communication link. Adjustment of the extension arm permits movement of the outdoor broadband unit relative to a position of the satellite antenna.

19 Claims, 10 Drawing Sheets

MECHANICAL MOUNTING FOR FIXED WIRELESS CUSTOMER PREMISES EQUIPMENT

BACKGROUND

Bundled media services, such as combination packages of television, telephone, and broadband Internet services, have been successfully offered to households with wired connections to service provider networks. Households in areas without such wired connections (e.g., customers in regions that cannot be reached via conventional communication media, such as optical cables, copper cables, and/or other fixed wire-based technologies) may rely on fixed wireless networks for some of these services (e.g., broadband access). However, previous generations of fixed wireless networks have generally been unsuccessful. Expensive network equipment and customer premises equipment (CPE), high CPE installation costs, use of proprietary technology, and low data rates are among some of the reasons that these fixed wireless networks remained unpopular. As wireless network data rates improve using fourth generation (4G) technologies, such as Long-Term Evolution (LTE), such network data rates have made it easier to implement fixed wireless networks.

DETAILED DESCRIPTION OF PREFERRED EMBODIMENTS

The following detailed description refers to the accompanying drawings. The same reference numbers in different drawings may identify the same or similar elements.

Systems and/or methods described herein may provide mechanical mounting for a customer premises equipment (CPE) wireless architecture that includes combined gateway equipment. The combined gateway equipment may include satellite and radio frequency (RF) antennas that are mounted (e.g., on a roof), by an installer, at a customer premises. The RF antenna may be associated with an outdoor broadband unit that includes a LTE module capable of communicating with a wireless network. The outdoor broadband unit may also include a broadband home router (BHR) capable of communicating with a customer premises network.

In one example implementation, the outdoor broadband unit may be mechanically coupled, via an extension arm, to a structure supporting the satellite antenna. The extension arm may be adjusted so that the outdoor broadband unit is positioned above, below, or to a side of the satellite antenna, and receives an acceptable signal strength from a wireless (e.g., LTE) network.

In another example implementation, the outdoor broadband unit may be mechanically coupled directly to the structure supporting the satellite antenna via connection mechanisms and an opening provided in the outdoor broadband unit. The structure supporting the satellite antenna may be formed from a material that does not interfere with a wireless signal received by the outdoor broadband unit.

In still another example implementation, the outdoor broadband unit may be installed at a location of the customer premises that is separate from a location associated with the satellite antenna. In such an arrangement, the outdoor broadband unit may positioned away from the satellite antenna so that the satellite antenna does not interfere with a wireless signal received by the outdoor broadband unit.

Figure 1:
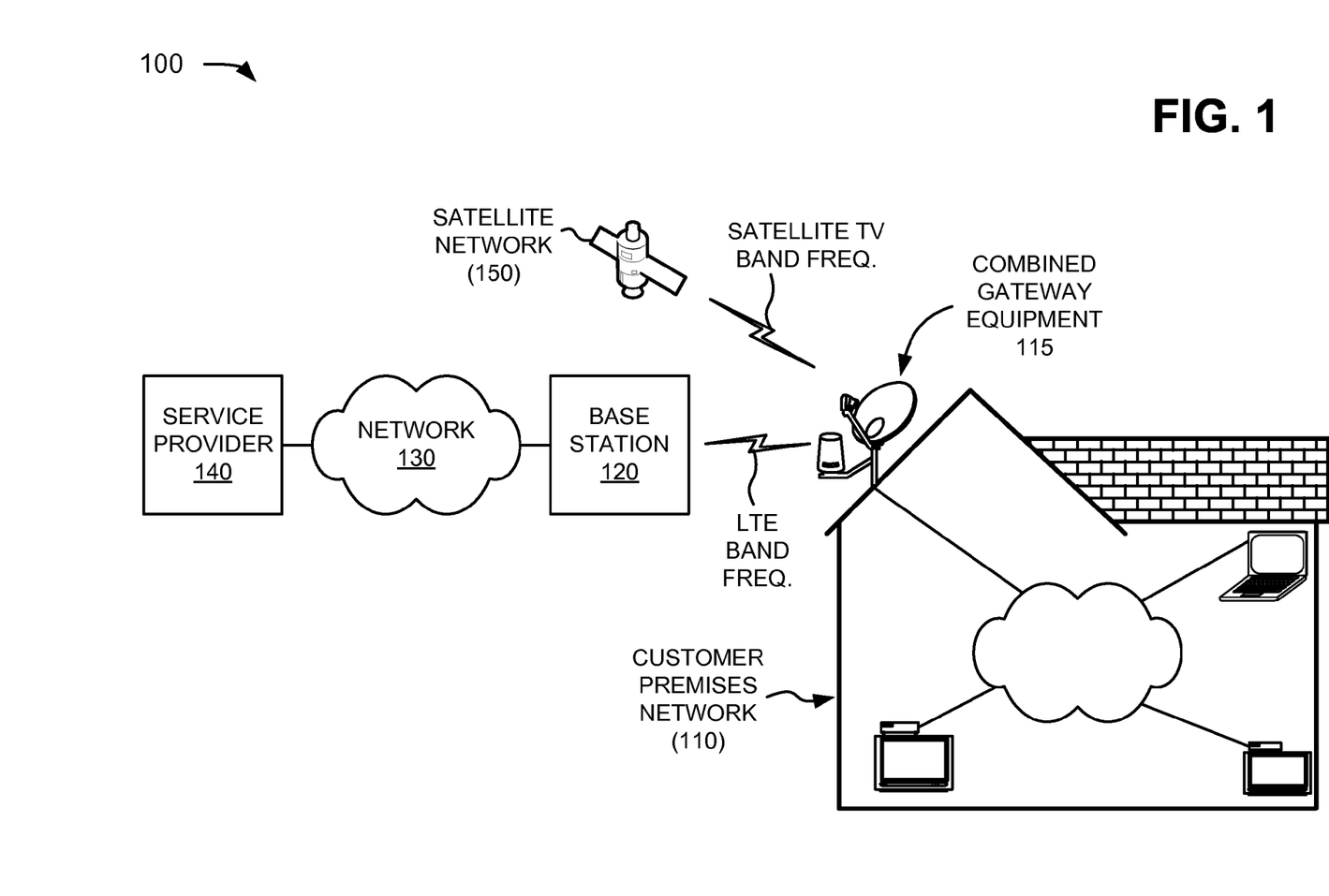
FIG. 1 is a diagram of an example environment in which systems and/or methods described herein may be implemented.

FIG. 1 is a diagram of an example environment 100 in which systems and/or methods described herein may be implemented. As illustrated, environment 100 may include a customer premises network 110, combined gateway equipment 115, a base station 120, a network 130, a service provider 140, and a satellite network 150. A single customer premises network 110, base station 120, network 130, service provider 140, and satellite network 150 have been illustrated in FIG. 1 for simplicity. In practice, there may be more customer premises networks 110, combined gateways 115, base stations 120, networks 130, service providers 140, and/or satellite networks 150.

Customer premises network 110 may include one or more devices connected to each other, base station 120, and/or satellite network 150. Devices in customer premises network 110 may include, for example, set-top boxes (STBs), televisions, computers, and home networking equipment (e.g., routers, cables, splitters, local gateways, etc.). Devices within customer premises network 110 may be connected via wired (e.g., coaxial cable, Telecommunications Industry Association category 5 ("cat 5") cable, etc.) or wireless connections (e.g., using network devices such as those available under the IEEE 802.11 wireless LAN standards) to form a LAN. In the example shown in FIG. 1, customer premises network 110 may connect to base station 120 through a two-way wireless connection, such as using a LTE band frequency, and may connect to satellite network 150 through a one-way (e.g., downlink) wireless connection, such as using a satellite television (TV) band frequency. The two-way wireless connection and the one-way wireless connection may be implemented using combined gateway equipment 115.

Combined gateway equipment 115, which is described in more detail below, may generally include mechanisms for communicating with satellite network 150 (to provide satellite-based communications) and for communicating with base station 120 (to provide RF-based communications). Combined gateway equipment 115 may connect, such as via a coaxial connection, to devices inside of the customer premises, such as the devices connected to customer premises network 110.

Base station 120 may include one or more computation and/or communication devices that receive voice and/or data (e.g., video content) from service provider 140 (e.g., via network 130) and transmit that voice and/or data to customer premises network 110. Base station 120 may also include one or more devices that receive voice and/or data from customer premises network 110 and transmit that voice and/or data to service provider 140 (e.g., via network 130). In one example implementation, base station 120 may utilize LTE standards operating in a 700 megahertz (MHz) frequency band.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one example implementation, network 130 may include core network equipment, such as a packet data network (PDN) gateway (PGW), a serving gateway (SGW), a mobility management entity (MME), etc.

Service provider 140 may include one or more server devices, or other types of computation or communication devices, that gather, process, search, and/or provide information in a manner described herein. In one implementation, service provider 140 may include a web server, a computer system, an application, a cable head-end, and/or a broadcasting device capable of providing Internet protocol (IP)-based content and/or services to devices in customer premises network 110.

Satellite network 150 may provide multimedia content from, for example, a direct broadcast satellite (DBS) service provider (not shown). Satellite network 150 may provide a downlink signal over a designated satellite TV band frequency, typically in the range of 950 MHz to 2150 MHz. The downlink signal may be received using a satellite antenna/receiver system at the customer premises to present satellite TV content to a user.

In implementations described herein, customer premises network 110 may combine LTE functionality with satellite TV service. Using combined gateway equipment 115, which includes an outdoor LTE module, both broadband (over LTE) service (e.g., via base station 120) and satellite TV service (e.g., via satellite network 150) may be brought into customer premises network 110 over a single coaxial line. This architecture may reduce equipment installation time due to the use of a single coaxial line for all the services. Both installation costs and recurrent operational costs can be reduced.

While implementations herein are described primarily in the context of broadband services via LTE, other wireless protocols may be used. For example, components conforming to LTE standards described herein may be replaced by components conforming to other network protocols, such as, for example, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
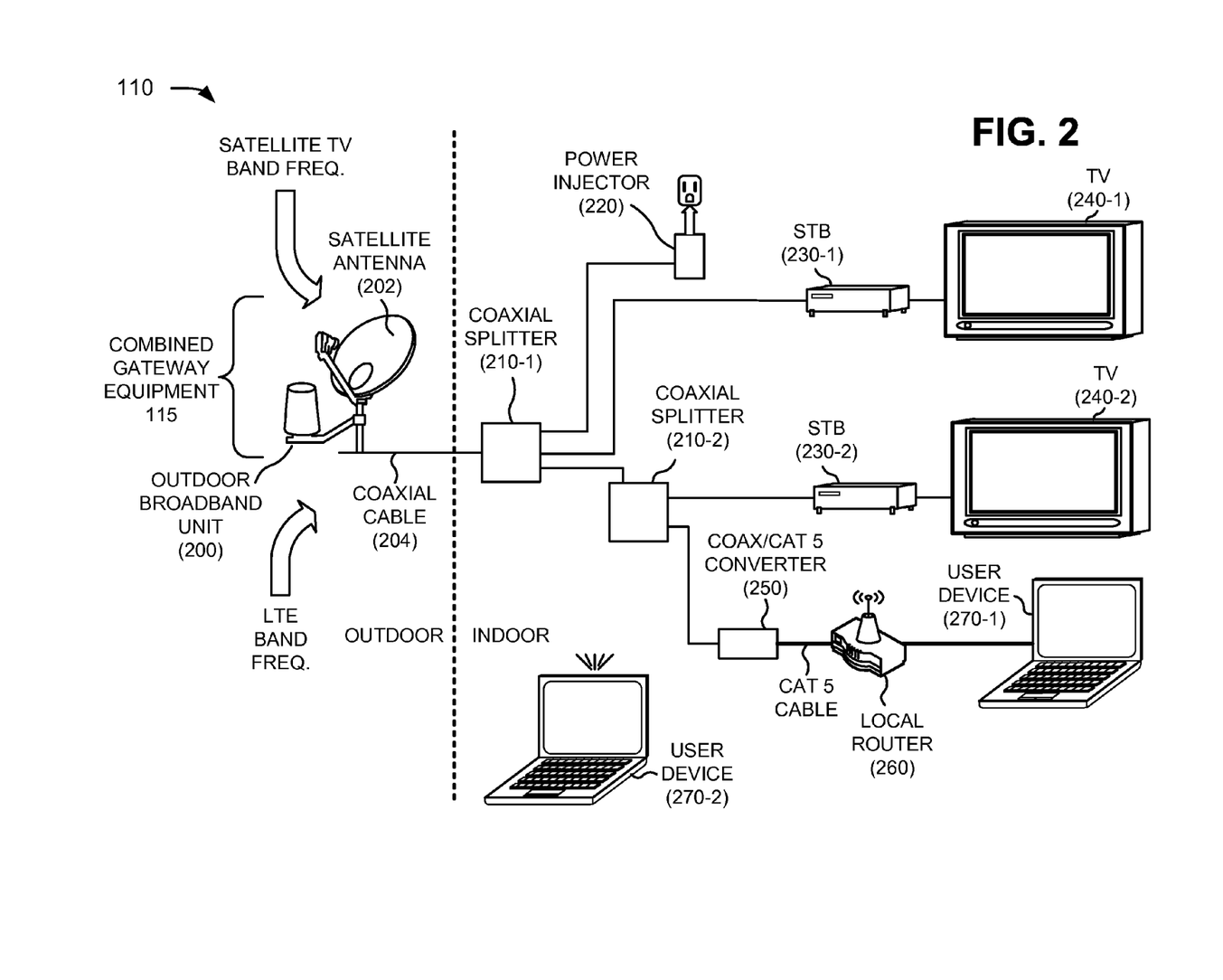
FIG. 2 is a diagram of an example customer premises network illustrated in FIG. 1 according to an implementation described herein.

FIG. 2 is a diagram of an example customer premises network 110 according to an implementation described herein. As illustrated, combined gateway equipment 115 of customer premises network 110 may include an outdoor broadband unit 200 and a satellite antenna 202. A coaxial cable 204 may connect combined gateway equipment 115 to the indoor portion of customer premises network 110. Customer premises network 110 may further include coaxial splitters 210-1 and 210-2 (referred to herein collectively as "coaxial splitters 210" or generically as "coaxial splitter 210"), a power injector 220, set-top boxes (STBs) 230-1 and 230-2 (referred to herein collectively as "STBs 230" or generically as "STB 230"), televisions 240-1 and 240-2 (referred to herein collectively as "televisions 240"), a coax/Cat 5 converter 250, a local router 260, and user devices 270-1 and 270-2 (referred to herein collectively as "user devices 270" or generically as "user device 270"). One outdoor broadband unit 200, two coaxial splitters 210, one power injector 220, two STBs 230, two televisions 240, one coax/Cat 5 converter 250, one local router 260, and two user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, and/or user devices 270.

Outdoor broadband unit 200 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with base station 120) and IP protocols (e.g., associated with user devices 270). Outdoor broadband unit 200 may be physically deployed with satellite antenna 202 (e.g., on a roof or a side wall of a house associated with customer premises network 110) as part of combined gateway 115. For example, outdoor broadband unit 200 may utilize a pre-existing or a new satellite TV installation in a way that both broadband (over LTE) service and satellite TV are brought indoors (e.g., inside the customer premises) over a coaxial cable 204. Outdoor broadband unit 200 is discussed further in connection with, for example, FIGS. 3 and 5.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitters 210 may include conventional splitting technologies to filter LTE and satellite TV signals. In one implementation, each coaxial splitter 210 may include a SWiM splitter.

Power injector 220 may include a conventional mechanism for injecting direct current (DC) power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 converter 250 may include a conventional device to convert incoming signals from coaxial cables to outgoing signals on Cat 5 cables. In one example, STB 230 and coax-to-Cat5 converter 250 may facilitate allocating logical channels using different frequency blocks for viewer-selected television programming and broadband signals.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a Universal Serial Bus (USB) Ethernet Router that is capable of meeting LTE quality of service (QoS) standards.

User device 270 may include any device that is capable of communicating with customer premises network 110 via local router 260. For example, user device 270 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a tablet computer, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a laptop computer, a personal computer, a gaming system, etc.

Although FIG. 2 shows example components of customer premises network 110, in other implementations, customer premises network 110 may contain fewer components, different components, differently arranged components, and/or additional components than those depicted in FIG. 2. Alternatively, or additionally, one or more components of customer premises network 110 may perform one or more other tasks described as being performed by one or more other components of customer premises network 110.

Figure 3:
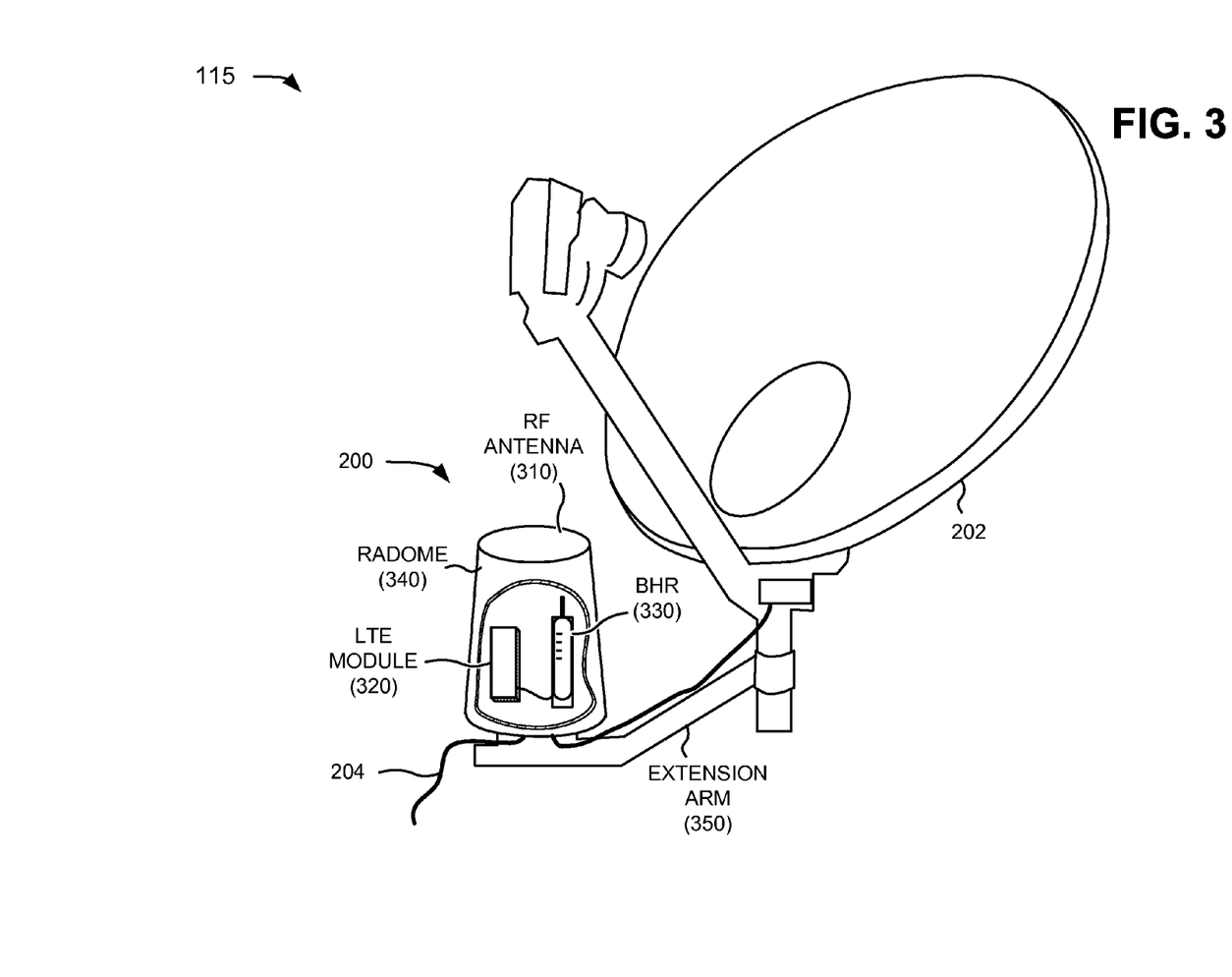
FIG. 3 is a diagram of example components of a combined gateway of the customer premises network depicted in FIG. 2.

FIG. 3 is a diagram of example components of combined gateway equipment 115 of customer premises network 110. As illustrated, combined gateway equipment 115 may include outdoor broadband unit 200 and satellite antenna 202. Outdoor broadband unit 200 and satellite antenna 202 my include features described above in connection with, for example, FIGS. 1 and 2. Outdoor broadband unit 200 may include a radio frequency (RF) antenna 310, a LTE module 320, and a broadband home router (BHR) 330, all housed in a radome 340. In one implementation, as shown in FIG. 3, outdoor broadband unit 200 may be mounted on an extension arm 350 connected to a structure (e.g., an arm or a pole) supporting satellite antenna 202.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide them to LTE module 320/BHR 330. In one implementation, for example, LTE module 320/BHR 330 may communicate with a base station (e.g., base station 120) connected to a network (e.g., network 130) to send and/or receive signals from user devices 270. In implementations herein, RF antenna 310 may be enclosed by radome 340, integrated with radome 340, or external to radome 340. While one RF antenna 310 is shown in FIG. 3, outdoor broadband unit 200 may include more than one antenna in other implementations.

In one implementation, RF antenna 310 may include a wideband multiple beam antenna, with partially overlapping antenna beams, spanning 360 degrees in azimuth (x-y plane). For example, antenna 310 may include between four and eight beams to achieve desirable antenna gains and reduction of interference. Additionally, or alternatively, RF antenna 310 may employ two polarizations per beam for 2×2 downlink multiple-input and multiple-output (MIMO) operation.

In another implementation, RF antenna 310 may include a fixed dually-polarized directional antenna. As a directional antenna, RF antenna 310 may use polarizations matched to the polarizations of a particular base station (e.g., base station 120). For example, a polarization of RF antenna 310 may match a polarization of a serving enhanced Node B (eNB) or base station (e.g., base station 120). Antenna pointing for the directional antenna may be conducted, for example, during installation of outdoor broadband unit 200.

LTE module 320 may include a device (e.g., a modem) with communication capability via an air interface. For example, LTE module 320 may receive broadband signals and/or voice over Internet protocol (VoIP) signals from base station 120 (e.g., via RF antenna 310) and may transmit broadband signals and/or VoIP signals to base station 120 (e.g., via RF antenna 310). LTE module 320 may employ frequency division duplex (FDD) and/or time division duplex (TDD) techniques to facilitate downlink and uplink transmissions. In one implementation, LTE module 320 may include a beam selection mechanism that selects the best antenna beam, from RF antenna 310, according to a certain optimization criteria. Beam selection may be performed, for example, during initial installation and/or regular maintenance of outdoor broadband unit 200. Additionally, or alternatively, LTE module 320 may select any of the RF antenna 310 beams, based on real-time measurements, during normal operation.

BHR 330 may include a device for buffering and forwarding data packets toward destinations. For example, BHR 330 may receive data packets from base station 120 (e.g., via LTE module 320) and may forward the data packets toward user devices 270. In addition, BHR 330 may receive data packets from user devices 270 (e.g., via local router 260) and may forward the data packets toward recipient devices (e.g., service provider 140) via network 130.

In one example implementation, BHR 330 may be associated with a coaxial network controller (not shown) that provides an interface for Ethernet over coaxial signals, such as signals transmitted over coaxial cable 204 and into customer premises network 110. The coaxial network controller may act as a bridge device to receive signals from LTE module 320 via a wired USB connection and to convert the signals to an Ethernet over coax signal. The Ethernet over coax signal may be assigned a logical channel (e.g., according to SWiM guidelines) and may be combined with coaxial input from satellite antenna 202. In one implementation, the output from coaxial network controller may be inserted in a Mid-RF MoCA channel that is separate from the 950 MHz to 2150 MHz range of a typical satellite TV system.

Radome 340 (shown with a cut-away view to reveal LTE module 320 and BHR 330) may provide a weatherproof enclosure to protect RF antenna 310, LTE module 320, BHR 330, and/or other components of outdoor broadband unit 200. Generally, radome 340 may include any RF transparent or substantially RF transparent structure (e.g., a cover) that protects components in an outdoor environment.

Combined gateway equipment 115 may be integrated with the SWiM environment associated with satellite antenna 202 to provide both TV service and broadband wireless service. With this architecture, combined gateway equipment 115 may require only one coax line leading from outdoor broadband unit 200/satellite antenna 202. This single coaxial line may feed the in-home coaxial installation to deliver satellite TV service and LTE service to corresponding STBs 230 and user devices 270 (e.g., as shown in FIG. 2). Components of outdoor broadband unit 200, such as RF antenna 310, LTE module 320, and BHR 330, may be powered using coax cable 204.

Although FIG. 3 shows example components of combined gateway equipment 115, in other implementations, combined gateway equipment 115 may contain fewer components, different components, differently arranged components, and/or additional components than depicted in FIG. 3. Alternatively, or additionally, one or more components of combined gateway equipment 115 may perform one or more other tasks described as being performed by one or more other components of combined gateway equipment 115. In one alternative implementation, one or more functions of combined gateway equipment 115 may be moved to another location, such as internal to the customer premises. For example, a bridge may be installed in combined gateway equipment 115 instead of BHR 330. The bridge may function to combine coaxial input from satellite antenna 202 with the output from LTE module 320 into a single coax line, which may be forwarded to a broadband router that is installed inside the customer premises.

Figure 4:
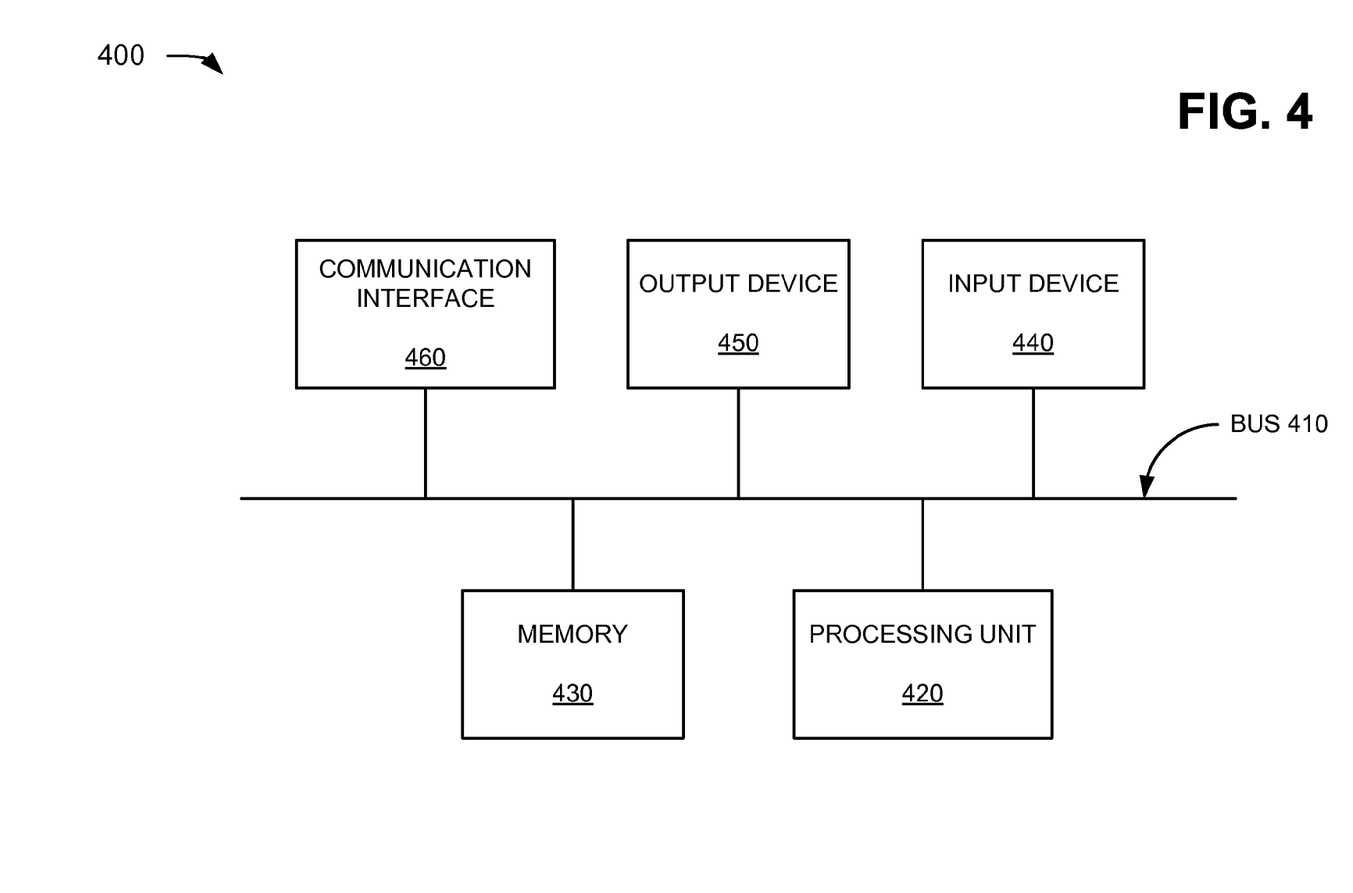
FIG. 4 is a diagram of example components of a device that may correspond to one of the devices of FIG. 1 or 2.

FIG. 4 is a diagram of example components of a device 400 that may correspond to one of the devices of environment 100 and/or customer premises network 110 (e.g., LTE module 320 and/or BHR 330). As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other devices of environment 100 and/or customer premises network 110.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

Figure 5:
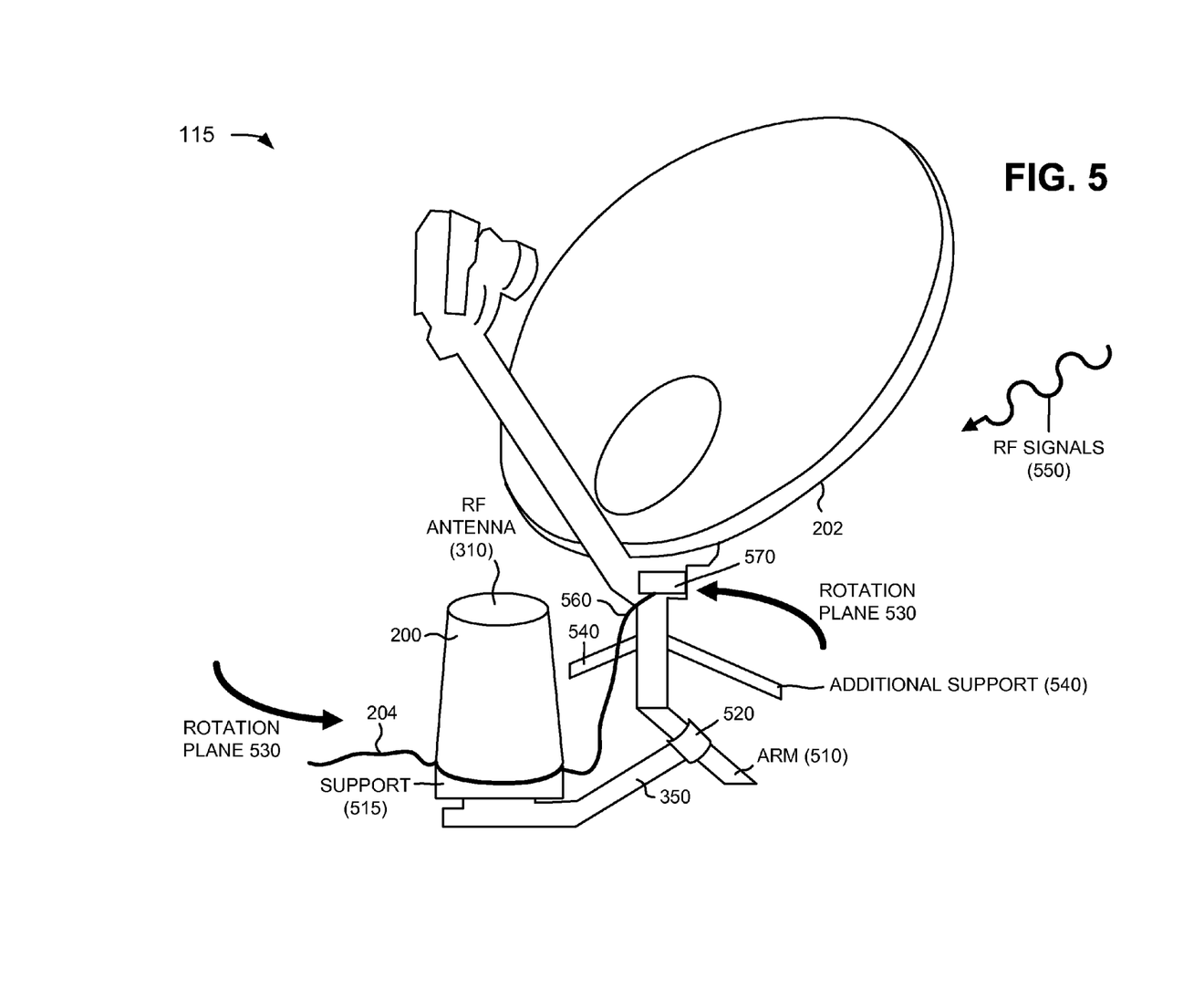
FIG. 5 is a diagram of further example components of the combined gateway of the customer premises network.

FIG. 5 is a diagram of further example components of combined gateway 115. As shown in FIG. 5, extension arm 350 and outdoor broadband unit 200 (including RF antenna 310, LTE module 320, BHR 330, and radome 340) may be adjustably rotated around a support arm 510 of combined gateway 115. Support arm 510 may provide support for outdoor broadband unit 200 and satellite antenna 202. A support 515 may be mechanically coupled to or integrally formed with extension arm 350, and may provide mechanical support for outdoor broadband unit 200. A collar 520 may be used to tighten and release extension arm 350 so that extension arm 350 can be rotated around support arm 510.

An installer that is installing combined gateway equipment 115 may loosen collar 520 to adjust the rotation of extension arm 350 (and outdoor broadband unit 200). Rotating extension arm 350 around support arm 510 may rotate outdoor broadband unit 200 through a rotation plane 530. The installer may adjust the rotation of outdoor broadband unit 200 in order to find an "optimal" physical position for maximum reception of RF signals from base station 120 (e.g., over the LTE frequency band). Although collar 520 is illustrated in FIG. 5 as connecting support arm 510 to extension arm 350, in alternative implementations, other physical connection mechanisms may be used.

In some installations, arm 510 may be further supported by one or more additional supports 540. However, additional supports 540 may prevent extension arm 350 and outdoor broadband unit 200 from being rotated completely through rotation plane 530. Thus, outdoor broadband unit 200 may not be rotated to an "optimal" physical position for maximum reception of RF signals 550 from base station 120 (e.g., over the LTE frequency band). Additionally, satellite antenna 202 and/or the support structure (e.g., arm 510) of satellite antenna 202 may block RF signals 550 and distort a radiation pattern destined for outdoor broadband unit 200, which may decrease the strength of RF signals 550 received by outdoor broadband unit 200.

As further shown in FIG. 5, a communication cable 560 (e.g., a coaxial cable) may connect outdoor broadband unit 200 to an interface component 570 of satellite antenna 202 that receives transmissions received by satellite antenna 202. The transmissions receive by satellite antenna 202 may be provided to outdoor broadband unit 200 via communication cable 560 and interface component 570. Outdoor broadband unit 200 may receive the satellite transmissions and may receive RF signals via RF antenna 310. Outdoor broadband unit 200 may utilize a communication cable (e.g., coaxial cable 204) to provide the received satellite transmissions and the received RF signals to the indoor portion of customer premises network 110.

Although FIG. 5 shows example components of combined gateway equipment 115, in other implementations, combined gateway equipment 115 may contain fewer components, different components, differently arranged components, and/or additional components than depicted in FIG. 5. Alternatively, or additionally, one or more components of combined gateway equipment 115 may perform one or more other tasks described as being performed by one or more other components of combined gateway equipment 115.

Figure 6:
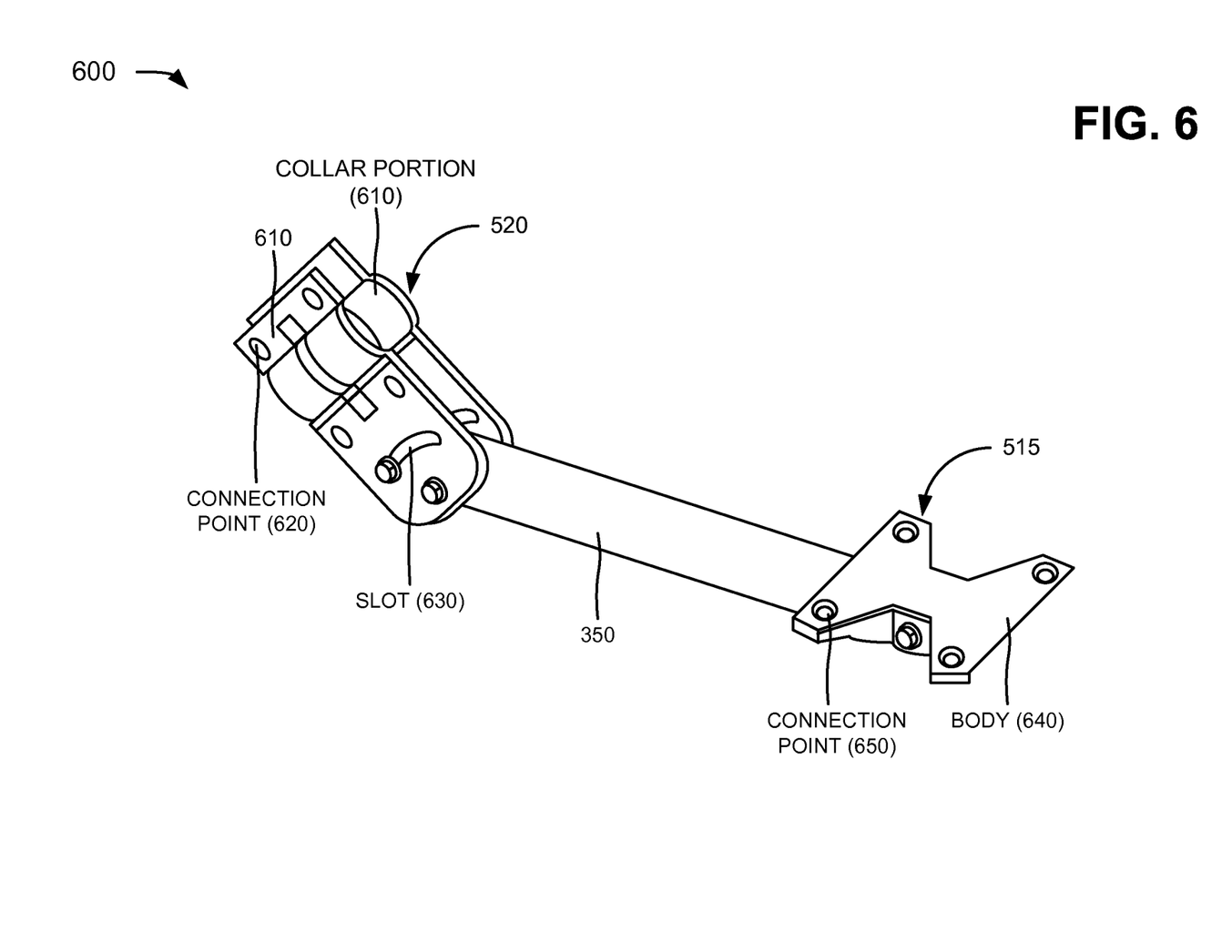
FIG. 6 is a diagram of components of an example mechanical mounting interface for an outdoor broadband unit depicted in FIG. 2.

FIG. 6 is a diagram of components of an example mechanical mounting interface 600 for outdoor broadband unit 200. As shown in FIG. 6, mechanical mounting interface 600 may include extension arm 350 interconnecting support 515 and collar 520. Extension arm 350, support 515, and collar 520 may include the features described above in connection with one or more of, for example, FIGS. 3 and 5.

As further shown in FIG. 6, collar 520 may include two collar portions 610 shaped to receive a structure (e.g., support arm 510) between them. For example, each collar portion 610 may include a rounded section that is capable of receiving and retaining a circular-shaped support arm 510. Collar portions 610 may be coupled together via one or more connection points 620 and connection mechanisms (e.g., bolts, nuts, screws, etc.) provided in connection points 620. Support arm 510 may be retained between collar portions 610 when collar portions 610 are coupled together at connection points 620. Each collar portion 610 may include a slot 630 that enables extension arm 350 to be rotatably coupled to collar portion 610. An installer may rotate extension arm 350, via slots 630, in order adjust the position of outdoor broadband unit 200. Once the installer has settled on a position for outdoor broadband unit 200, extension arm 350 may fixedly coupled to collar portions 610 via connection mechanisms (e.g., bolts, nuts, screws, etc.) provided through slots 630. In one example implementation, mechanical mounting interface 600 may enable outdoor broadband unit 200 to be rotated three-hundred and sixty degrees (360°) around satellite antenna 202.

Support 515 may include a body 640 that is sized and shaped to support outdoor broadband unit 200. Body 640 may include one or more connection points 650. Outdoor broadband unit 200 may be coupled to body 640 via connection points 650 and connection mechanisms (e.g., bolts, nuts, screws, etc.) provided in connection points 650.

In one example implementation, components of mechanical mounting interface 600 may be formed in a variety of sizes and shapes depending on the size, shape, and/or weight of outdoor broadband unit 200 and/or support arm 510. In one example, the components of mechanical mounting interface 600 may have dimensions that ensure that outdoor broadband unit 200 is adequately supported and protected. The dimensions (e.g., lengths, widths, or thicknesses) of the components of mechanical mounting interface 600 may depend on the material, shape, and/or the degree of support and protection to be provided by the components of mechanical mounting interface 600. The components of mechanical mounting interface 600 may be made from a variety of materials, including any of the materials used to make support structures for satellite antennas. For example, in one implementation, the components of mechanical mounting interface 600 may be made from metals, thermoplastics, elastomers (e.g., synthetic rubber and/or natural rubber), and/or other similar materials.

Although FIG. 6 shows example components of mechanical mounting interface 600, in other implementations, mechanical mounting interface 600 may include fewer components, different components, differently arranged components, or additional components than depicted in FIG. 6. Alternatively, or additionally, one or more components of mechanical mounting interface 600 may perform one or more other tasks described as being performed by one or more other components of mechanical mounting interface 600.

Figure 7:
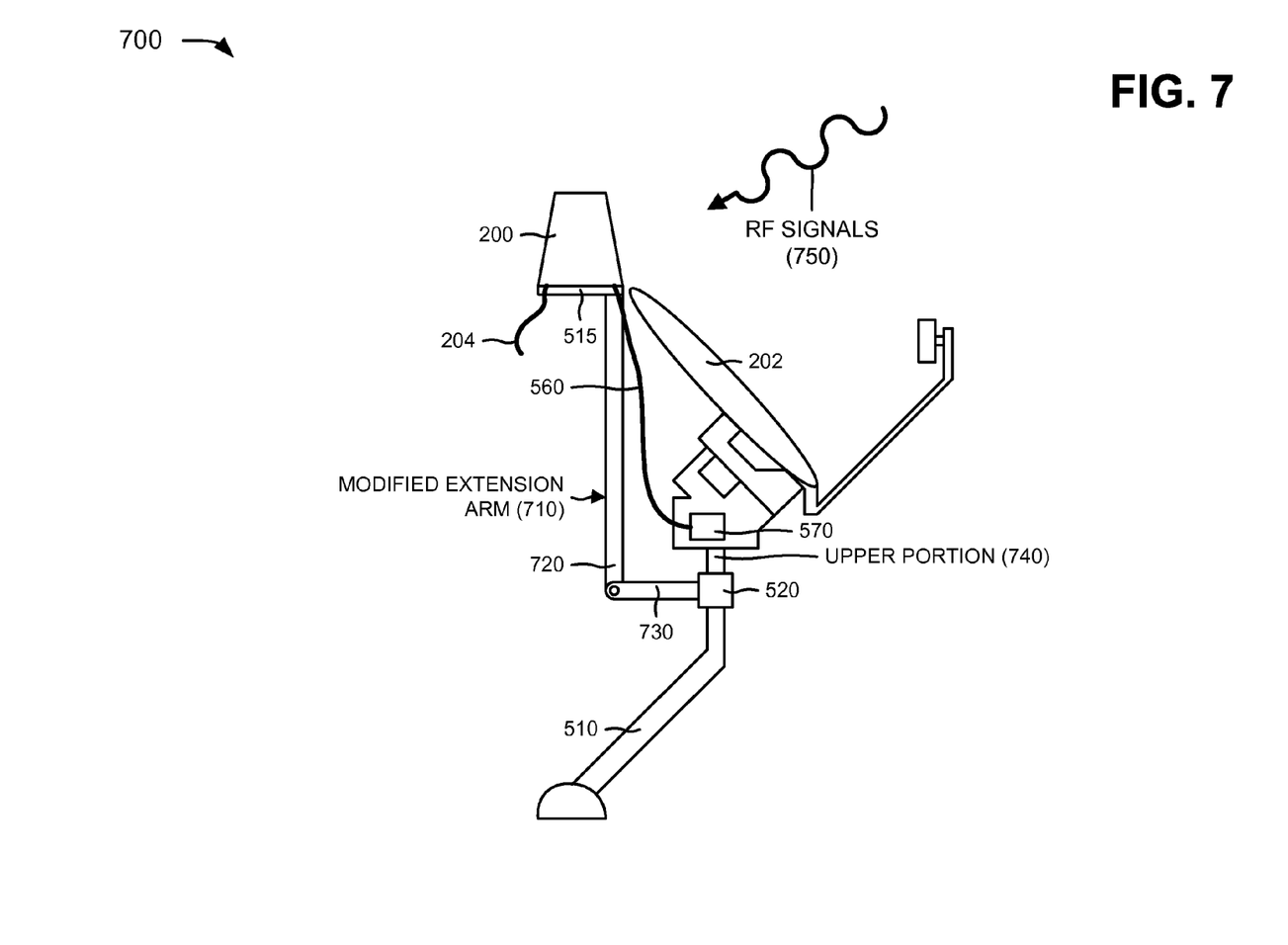
FIG. 7 is a diagram of an example installation arrangement for the combined gateway of the customer premises network.

FIG. 7 is a diagram of an example installation arrangement 700 for combined gateway 115 of customer premises network 110. As shown in FIG. 7, arrangement 700 may include outdoor broadband unit 200, satellite antenna 202, coaxial cable 204, support arm 510, support 515, collar 520, communication cable 560, and interface component 570. Outdoor broadband unit 200, satellite antenna 202, coaxial cable 204, support arm 510, support 515, collar 520, communication cable 560, and interface component 570 may include the features described above in connection with one or more of, for example, FIGS. 2-6. In one example implementation, arrangement 700 of FIG. 7 may prevent satellite antenna 202 and support arm 510 from blocking RF signals and distorting a radiation pattern received by outdoor broadband unit 200.

As further shown in FIG. 7, extension arm 350 may be replaced with a modified extension arm 710 that interconnects support 515 and collar 520. Modified extension arm 710 may include a first portion 720 that interconnects with support 515, and a second portion 730 that interconnects with collar 520. First portion 720 and second portion 730 may rotatably interconnect via a pivot joint or other connection mechanism that permits rotation. In arrangement 700, support 515 may be mechanically coupled to or integrally formed with modified extension arm 710, and may provide mechanical support for outdoor broadband unit 200. Collar 520 may be used to tighten and release modified extension arm 710 so that modified extension arm 710 can be rotated around an upper portion 740 of support arm 510. In one example implementation, modified extension arm 710 may enable outdoor broadband unit 200 to be rotated three-hundred and sixty degrees (360°) around satellite antenna 202.

An installer that is installing combined gateway equipment 115 may install satellite antenna 202 at a location (e.g., a roof or wall) of a customer premises. For example, the installer may mechanically couple support arm 510 to the customer premises location, and may mechanically couple satellite antenna 202 to support arm 510. The installer may connect satellite antenna 202 (e.g., interface component 570 of satellite antenna 202) to outdoor broadband unit 200 via communication cable 560. Outdoor broadband unit 200 may be previously connected to support 515, modified extension arm 710, and collar 520. The installer may loosen collar 520 to adjust the rotation of modified extension arm 710 (and outdoor broadband unit 200) around upper portion 740 of support arm 510. The installer may adjust the rotation of outdoor broadband unit 200 in order to find an "optimal" physical position for maximum reception of RF signals 750 from base station 120 (e.g., over the LTE frequency band). For example, the installer may position outdoor broadband unit 200 so that it is located away from (e.g., above, below, to the side, etc.) satellite antenna 202. The installer may then connect outdoor broadband unit 200 to devices of customer premises network 110 via coaxial cable 204.

In one example implementation, after the installer powers on outdoor broadband unit 200, LTE module 320 may provide real time monitoring of RF signals received from base station 120. Based on the monitoring, LTE module 320 may generate signals providing indications of the quality of the RF link received from base station 120. LTE module 320 may provide the signals to a visual indicator, such as a light emitting diode (LED), provided on the exterior of outdoor broadband unit 200, and the visual indicator may display the quality of the RF link based on the received signals. In one example, the LED may display a different color depending on a quality of the RF link (e.g., green for a "good" quality link, amber or yellow for a "marginal" quality link, and red for a "poor" quality link). The installer may thus adjust the position/orientation of outdoor broadband unit 200 to maximize the quality of the RF link without power cycling outdoor broadband unit 200 and without having to use additional equipment or to manually take additional link measurements.

Although FIG. 7 shows example components of arrangement 700, in other implementations, arrangement 700 may include fewer components, different components, differently arranged components, or additional components than depicted in FIG. 7. Alternatively, or additionally, one or more components of arrangement 700 may perform one or more other tasks described as being performed by one or more other components of arrangement 700.

Figure 8:
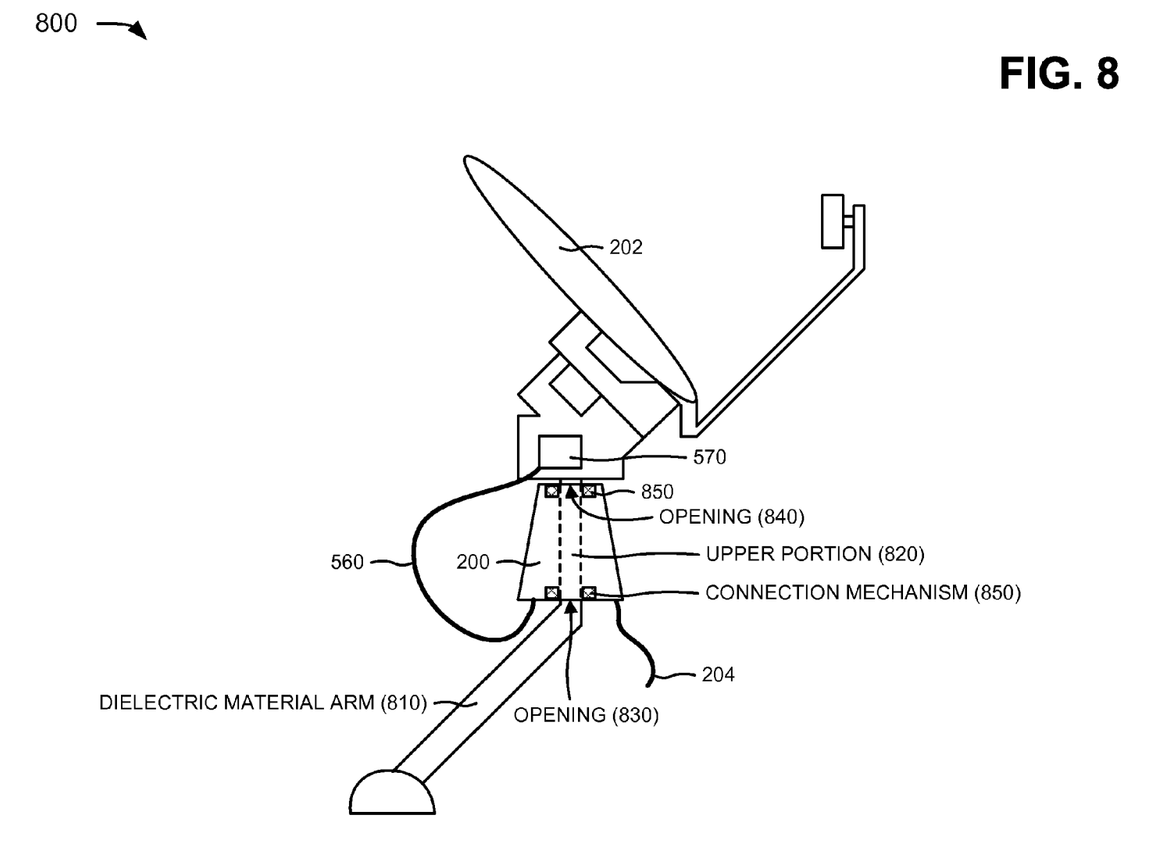
FIG. 8 is a diagram of another example installation arrangement for the combined gateway of the customer premises network.

FIG. 8 is a diagram of another example installation arrangement 800 for combined gateway 115 of customer premises network 110. As shown in FIG. 8, arrangement 800 may include outdoor broadband unit 200, satellite antenna 202, coaxial cable 204, communication cable 560, and interface component 570. Outdoor broadband unit 200, satellite antenna 202, coaxial cable 204, communication cable 560, and interface component 570 may include the features described above in connection with one or more of, for example, FIGS. 2-7.

As further shown in FIG. 8, support arm 510 may be replaced with a support arm 810 constructed of a material that does not interfere with RF signals received by outdoor broadband unit 200. For example, support arm 810 may be made from a dielectric material. However, in one example implementation, support arm 510 of FIG. 7 may also be made from a material, such as a dielectric material, that does not interfere with RF signals received by outdoor broadband unit 200. Support arm 810 may include an upper portion 820 that may be provided through openings 830 and 840 formed in outdoor broadband unit 200 (e.g., in radome 340). Outdoor broadband unit 200 may be mechanically secured to upper portion 820 of support arm 810 via one or more connection mechanisms 850. In one example, connection mechanism 850 may include a coupling that engages an outer surface of upper portion 820 of support arm 810 and prevents outdoor broadband unit 200 from moving unless sufficient force is applied to outdoor broadband unit 200.

An installer that is installing combined gateway equipment 115 may install support arm at a location (e.g., a roof or wall) of a customer premises. For example, the installer may mechanically couple support arm 810 to the customer premises location, and may provide upper portion 820 of support arm 810 through openings 830/840 of outdoor broadband unit 200. Connection mechanism 850 may retain outdoor broadband unit 200 on upper portion 820 of support arm 810. The installer may then mechanically couple satellite antenna 202 to support arm 810. Alternatively, the installer may mechanically couple satellite antenna 202 to support arm 810 first, and then may attach outdoor broadband unit 200 to upper portion 820 of support arm 810. In such an arrangement, radome 340 of outdoor broadband unit 200 may be configured to be opened and closed so that outdoor broadband unit 200 may be wrapped around upper portion 820 of support arm 810 via openings 830/840. Connection mechanism 850 may retain outdoor broadband unit 200 on upper portion 820 of support arm 810.

The installer may connect satellite antenna 202 (e.g., interface component 570 of satellite antenna 202) to outdoor broadband unit 200 via communication cable 560. The installer may then connect outdoor broadband unit 200 to devices of customer premises network 110 via coaxial cable 204.

Although FIG. 8 shows example components of arrangement 800, in other implementations, arrangement 800 may include fewer components, different components, differently arranged components, or additional components than depicted in FIG. 8. Alternatively, or additionally, one or more components of arrangement 800 may perform one or more other tasks described as being performed by one or more other components of arrangement 800.

Figure 9:
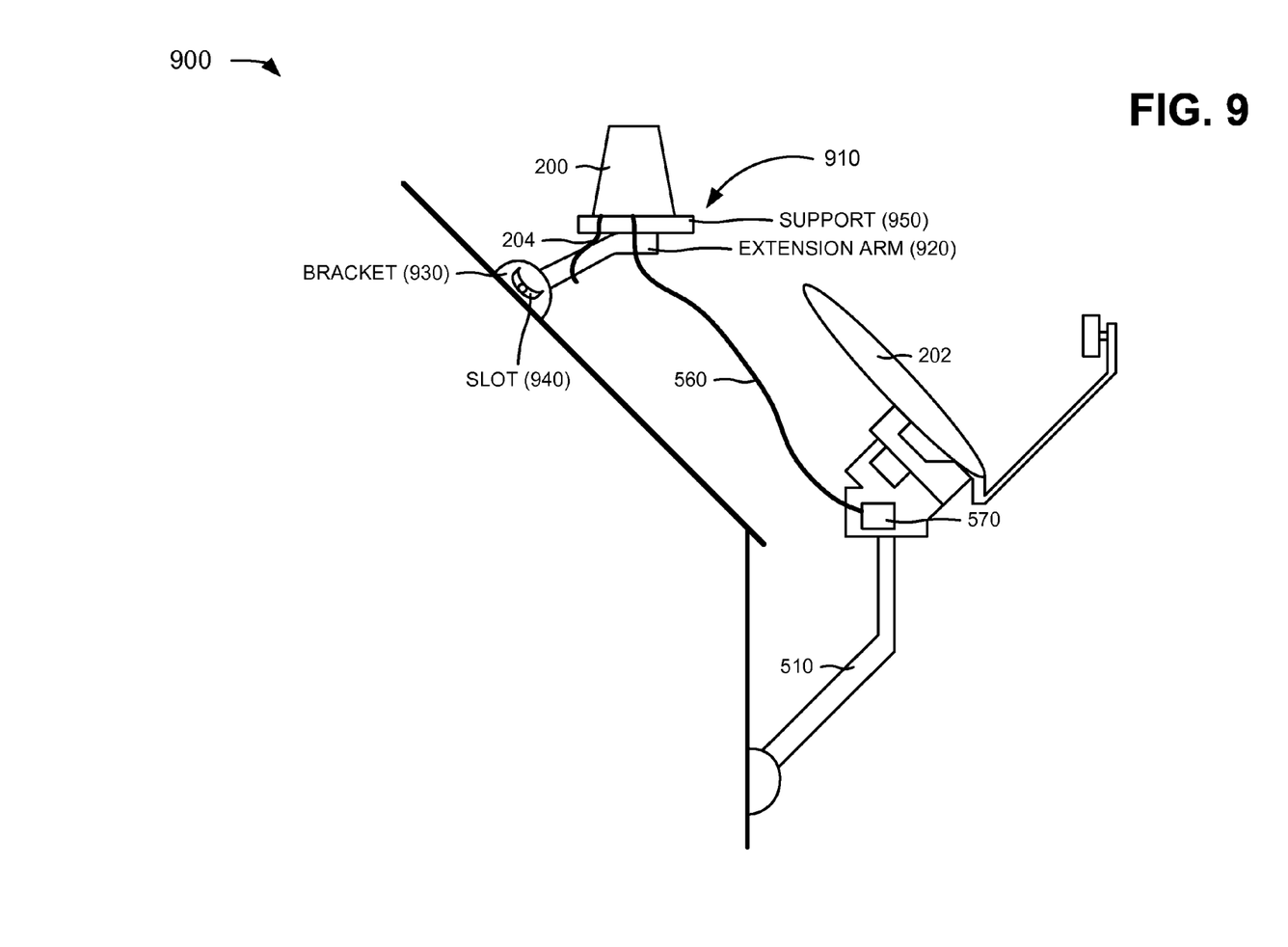
FIG. 9 is a diagram of still another example installation arrangement for the combined gateway of the customer premises network.

FIG. 9 is a diagram of still another example installation arrangement 900 for combined gateway 115 of customer premises network 110. As shown in FIG. 9, arrangement 900 may include outdoor broadband unit 200, satellite antenna 202, coaxial cable 204, support arm 510, communication cable 560, and interface component 570. Outdoor broadband unit 200, satellite antenna 202, coaxial cable 204, communication cable 560, and interface component 570 may include the features described above in connection with one or more of, for example, FIGS. 2-8.

As further shown in FIG. 9, outdoor broadband unit 200 may be installed at a location (e.g., a roof or wall) of a customer premises that is separate from a location of satellite antenna 202. In one example implementation, outdoor broadband unit 200 may be mechanically coupled to the customer premises via a mechanical mounting interface 910. Mechanical mounting interface 900 may include an extension arm 920, a bracket 930 with a slot 940, and a support 950. Extension arm 920 may include the features of extension arm 350, and may interconnect bracket 930 and support 950. Slot 940 that may enable extension arm 920 to be rotatably coupled to bracket 930. An installer may rotate extension arm 920, via slot 940, in order adjust the position of outdoor broadband unit 200. Once the installer has settled on a position for outdoor broadband unit 200, extension arm 920 may fixedly coupled to bracket 930 via connection mechanisms (e.g., bolts, nuts, screws, etc.) provided through slot 940. Support 950 may include a body that is sized and shaped to support outdoor broadband unit 200. Outdoor broadband unit 200 may be coupled to support 950 via one or more connection mechanisms (e.g., bolts, nuts, screws, etc.).

An installer that is installing combined gateway equipment 115 may install satellite antenna 202 at a first location (e.g., a roof or wall) of a customer premises. For example, the installer may mechanically couple support arm 510 at the first location of the customer premises, and may mechanically couple satellite antenna 202 to support arm 510. The installer may connect satellite antenna 202 (e.g., interface component 570 of satellite antenna 202) to outdoor broadband unit 200 via communication cable 560. Outdoor broadband unit 200 may be previously connected to extension arm 920, bracket 930, and support 950. The installer may attach bracket 930 at a second location of the customer premises, where the second location is different than the first location. The installer may adjust (e.g., via slot 940) the rotation of outdoor broadband unit 200 in order to find an "optimal" physical position for maximum reception of RF signals from base station 120 (e.g., over the LTE frequency band). The installer may then connect outdoor broadband unit 200 to devices of customer premises network 110 via coaxial cable 204.

Although FIG. 9 shows example components of arrangement 900, in other implementations, arrangement 900 may include fewer components, different components, differently arranged components, or additional components than depicted in FIG. 9. Alternatively, or additionally, one or more components of arrangement 900 may perform one or more other tasks described as being performed by one or more other components of arrangement 900.

Figure 10:
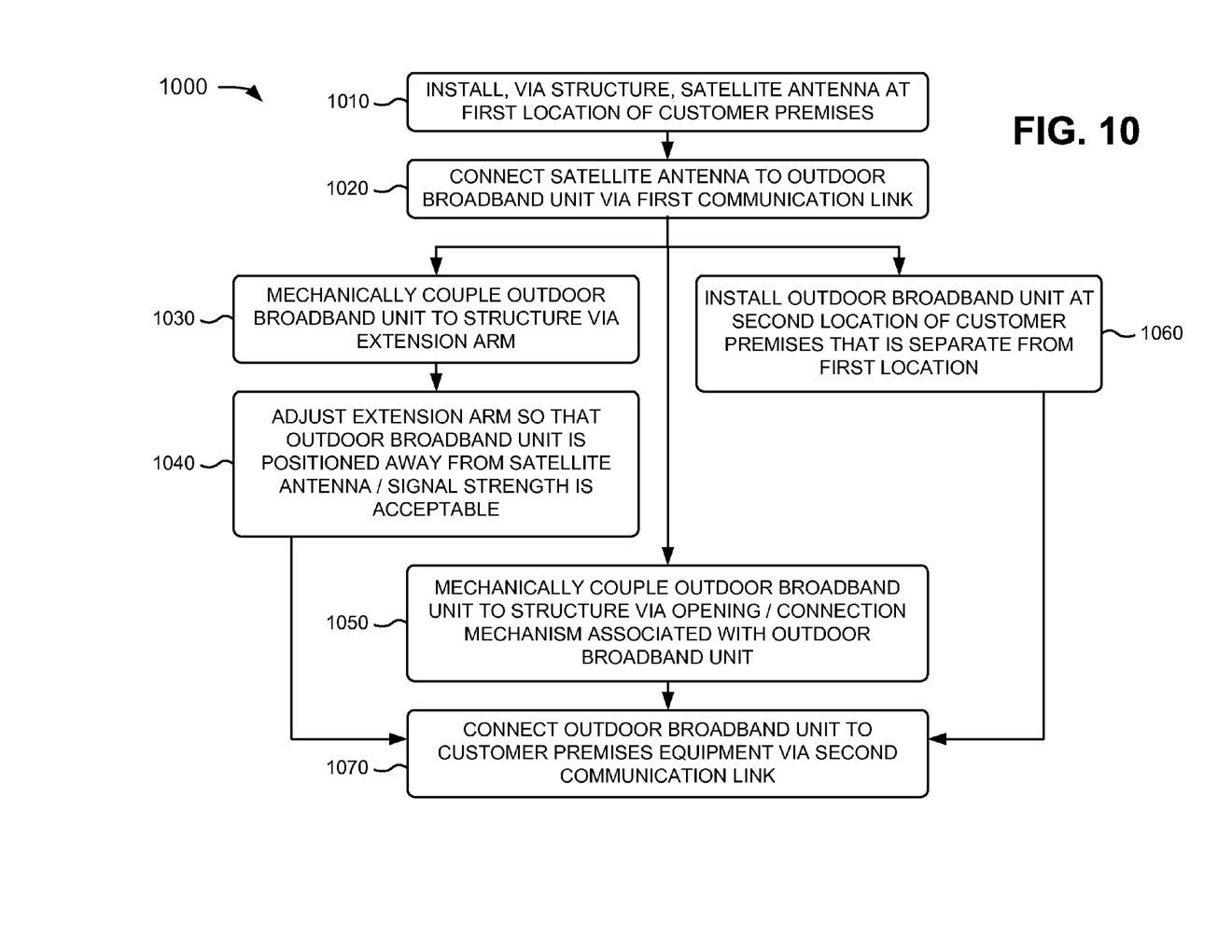
FIG. 10 is a flow chart of an example process for installing an outdoor portion of a fixed wireless customer premises network according to implementations described herein.

FIG. 10 is a flow chart of an example process 1000 for installing an outdoor portion of a fixed wireless customer premises network according to implementations described herein.

As shown in FIG. 10, process 1000 may include installing, via a support structure, a satellite antenna at a first location of a customer premises (block 1010), and connecting the satellite antenna to an outdoor broadband unit via a first communication link (block 1020). For example, in implementations described above in connection with FIG. 7, an installer that is installing combined gateway equipment 115 may install satellite antenna 202 at a location (e.g., a roof or wall) of a customer premises. In one example, the installer may mechanically couple support arm 510 to the customer premises location, and may mechanically couple satellite antenna 202 to support arm 510. The installer may connect satellite antenna 202 (e.g., interface component 570 of satellite antenna 202) to outdoor broadband unit 200 via communication cable 560.

As further shown in FIG. 10, process 1000 may include mechanically coupling the outdoor broadband unit to the support structure via an extension arm (block 1030), and adjusting the extension arm so that the outdoor broadband unit is positioned away from the satellite antenna and a signal strength received by the outdoor broadband unit is acceptable (block 1040). For example, in implementations described above in connection with FIG. 7, collar 520 may be used to tighten and release modified extension arm 710 so that modified extension arm 710 can be rotated around upper portion 740 of support arm 510. Outdoor broadband unit 200 may be previously connected to support 515, modified extension arm 710, and collar 520. The installer may loosen collar 520 to adjust the rotation of modified extension arm 710 (and outdoor broadband unit 200) around upper portion 740 of support arm 510. The installer may adjust the rotation of outdoor broadband unit 200 in order to find an "optimal" physical position for maximum reception of RF signals 750 from base station 120 (e.g., over the LTE frequency band). For example, the installer may position outdoor broadband unit 200 so that it is located away from (e.g., above, below, to the side, etc.) satellite antenna 202.

Returning to FIG. 10, process 1000 may alternatively include mechanically coupling the outdoor broadband unit to the support structure via an opening and a connection mechanism associated with the outdoor broadband unit (block 1050). For example, in implementations described above in connection with FIG. 8, the installer may provide upper portion 820 of support arm 810 through openings 830/840 of outdoor broadband unit 200. Connection mechanism 850 may retain outdoor broadband unit 200 on upper portion 820 of support arm 810. The installer may then mechanically couple satellite antenna 202 to support arm 810. Alternatively, the installer may mechanically couple satellite antenna 202 to support arm 810 first, and then may attach outdoor broadband unit 200 to upper portion 820 of support arm 810. In such an arrangement, radome 340 of outdoor broadband unit 200 may be configured to be opened and closed so that outdoor broadband unit 200 may be wrapped around upper portion 820 of support arm 810 via openings 830/840.

As further shown in FIG. 10, process 1000 may alternatively include installing the outdoor broadband unit at a second location of the customer premises that is separate from the first location (block 1060). After process blocks 1040, 1050, or 1060, process 1000 may include connecting the outdoor broadband unit to customer premises equipment via a second communication link (block 1070). For example, in implementations described above in connection with FIG. 9, outdoor broadband unit 200 may be installed at a location (e.g., a roof or wall) of a customer premises that is separate from a location of satellite antenna 202. In one example, outdoor broadband unit 200 may be mechanically coupled to the customer premises via mechanical mounting interface 910. The installer may connect outdoor broadband unit 200 to devices of customer premises network 110 via coaxial cable 204.

Systems and/or methods described herein may provide mechanical mounting for a CPE wireless architecture that includes combined gateway equipment. The combined gateway equipment may include satellite and RF antennas that are mounted (e.g., on a roof), by an installer, at a customer premises. The RF antenna may be associated with an outdoor broadband unit that includes a LTE module capable of communicating with a wireless network. The outdoor broadband unit may also include a BHR capable of communicating with a customer premises network.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A combined gateway for a fixed wireless network, the combined gateway comprising:
    a structure mounted to a customer premises;
    a satellite antenna mechanically coupled to the structure; and
    an outdoor broadband unit:
        mechanically coupled to the structure via an adjustable extension arm,
        connected to the satellite antenna via a first communication link, and
        connected to customer premises equipment via a second communication link,
    where adjustment of the extension arm permits movement of the outdoor broadband unit relative to a position of the satellite antenna and the extension arm is a support structure for the outdoor broadband unit and is not part of the satellite antenna,
    where the outdoor broadband unit further includes a light emitting diode (LED) to:
    emit a first color of light when signals received by the outdoor broadband unit are of a first quality,
    emit a second color of light when signals received by the outdoor broadband unit are of a second quality, and
    emit a third color of light when signals received by the outdoor broadband unit are of a third quality; and
    where the combined gateway is further configured to:
    allow an installer to adjust the orientation/position of the outdoor broadband unit based on the color of the light of the LED to maximize the quality of radio frequency (RF) link from the fixed wireless network without power cycling the outdoor broadband unit and without having to use additional equipment.

2. The combined gateway of claim 1, where the extension arm permits the outdoor broadband unit to be rotated three-hundred and sixty degrees (360.degree.) around the satellite antenna.

3. The combined gateway of claim 1, where the extension arm permits the outdoor broadband unit to be positioned to receive a maximum amount of radio frequency (RF) signals from the fixed wireless network.

4. The combined gateway of claim 1, where the extension arm is connected, at one end, to a coupler that is mechanically coupled to the structure.

5. The combined gateway of claim 1, where the extension is connected, at another end, to a support that is mechanically coupled to the outdoor broadband unit.

6. The combined gateway of claim 1, where the structure comprises a dielectric material.

7. A combined gateway for a fixed wireless network, the combined gateway comprising:
    a structure mounted to a customer premises, where the structure comprises a material that does not interfere with signals provided by the fixed wireless network;
    a satellite antenna mechanically coupled to the structure; and
    an outdoor broadband unit:
        mechanically coupled to the structure via a connection mechanism and an opening provided in the outdoor broadband unit,
        connected to the satellite antenna via a first communication link, and
        connected to customer premises equipment via a second communication link,
    where the outdoor broadband unit further includes a light emitting diode (LED) to:
    emit a first color of light when signals received by the outdoor broadband unit are of a first quality,
    emit a second color of light when signals received by the outdoor broadband unit are of a second quality, and
    emit a third color of light when signals received by the outdoor broadband unit are of a third quality; and
    where the combined gateway is further configured to:
    allow an installer to adjust the orientation/position of the outdoor broadband unit based on the color of the light of the LED to maximize the quality of radio frequency (RF) link from the fixed wireless network without power cycling the outdoor broadband unit and without having to use additional equipment.

8. The combined gateway of claim 7, where the structure comprises a support arm.

9. The combined gateway of claim 7, where the structure comprises a dielectric material.

10. The combined gateway of claim 7, where the connection mechanism comprises a coupling that engages an outer surface of the structure and prevents the outdoor broadband unit from moving.

11. The combined gateway of claim 7, where the outdoor broadband unit comprises a protective cover and the opening is provided in the protective cover.

12. The combined gateway of claim 11, where the protective cover comprises a radome made from a radio frequency (RF) transparent material.

13. The combined gateway of claim 7, where mechanically coupling the outdoor broadband unit to the structure permits the outdoor broadband unit to receive a maximum amount of radio frequency (RF) signals from the fixed wireless network.

14. The combined gateway of claim 7, where the fixed wireless network comprises a Long Term Evolution (LTE) network.

15. A combined gateway for a fixed wireless network, the combined gateway comprising:
    a satellite antenna installed at a first outdoor location of a customer premises; and an outdoor broadband unit:
  mechanically coupled to a mounting interface installed at a second outdoor location of the customer premises, where the second outdoor location is separate from the first outdoor location,
  connected to the satellite antenna via a first communication link, and
  connected to customer premises equipment via a second communication link,
where the outdoor broadband unit further includes a light emitting diode (LED) to:
emit a first color of light when signals received by the outdoor broadband unit are of a first quality,
emit a second color of light when signals received by the outdoor broadband unit are of a second quality, and
emit a third color of light when signals received by the outdoor broadband unit are of a third quality; and
where the combined gateway is further configured to:
allow an installer to adjust the orientation/position of the outdoor broadband unit based on the color of the light of the LED to maximize the quality of radio frequency (RF) link from the fixed wireless network without power cycling the outdoor broadband unit and without having to use additional equipment.

16. The combined gateway of claim 15, where the mounting interface comprises:
  a bracket mechanically coupled to the second outdoor location,
  an extension arm rotatably connected to the bracket at one end, and
  a support connected to another end of the extension arm and mechanically coupled to the outdoor broadband unit.

17. The combined gateway of claim 15, where the mounting interface permits the outdoor broadband unit to be positioned to receive a maximum amount of radio frequency (RF) signals from the fixed wireless network.

18. The combined gateway of claim 15, where the fixed wireless network comprises a Long Term Evolution (LTE) network.

19. The combined gateway of claim 15, where the first outdoor location includes a wall of the customer premises and the second outdoor location includes a roof of the customer premises.

* * * * *